United States Patent [19]

McKnight et al.

[11] 4,012,640
[45] Mar. 15, 1977

[54] X-RAY GENERATOR

[75] Inventors: William B. McKnight, Huntsville, Ala.; Marlan O. Scully, Tucson, Ariz.; William H. Louisell, Palos Verdes, Calif.

[73] Assignee: The United States of America as represented by the Secretary of the Army, Washington, D.C.

[22] Filed: Aug. 30, 1973

[21] Appl. No.: 393,239

[52] U.S. Cl. .............................................. 250/493
[51] Int. Cl.² ......................................... G21G 4/00
[58] Field of Search ........... 250/399, 492, 493, 503, 250/505, 510; 331/94.5 F, 94.5 Z

[56] References Cited

UNITED STATES PATENTS

| | | | |
|---|---|---|---|
| 3,233,107 | 1/1966 | Senett ................................ | 250/493 |
| 3,234,099 | 1/1966 | Baldwin et al. ..................... | 250/493 |
| 3,557,370 | 1/1971 | Piekenbrock ...................... | 250/493 |
| 3,617,939 | 11/1971 | Bond et al. ........................ | 331/94.5 |

OTHER PUBLICATIONS

"Practicable X-ray Amplifier" R. A. McCorkle, Phy. Rev. Letters; vol. 29, No. 15; Oct. 9, 1972; pp. 982–985.
"Lasers in Industry" edited by S.S. Charschan, Van Nostrand Reinhold Co., 1973. pp. 3 and 29–31.

Primary Examiner—Alfred E. Smith
Assistant Examiner—B. C. Anderson
Attorney, Agent, or Firm—Nathan Edelberg; Robert P. Gibson; Robert C. Sims

[57] ABSTRACT

A population inversion is established by beam foil excitation. A beam of completely stripped nuclei is passed through a foil target. An ion beam travels between the plates of a strip transmission line in a plane parallel to those plates. The foil is located in a slot in one of the plates. A voltage pulse is applied at the downstream end of the line and a wavefront propagates down the plates towards the upstream end. This pulse will cause deflection of the ion beam towards the foil along a linear intersection path which travels at approximately the velocity of light.

2 Claims, 1 Drawing Figure

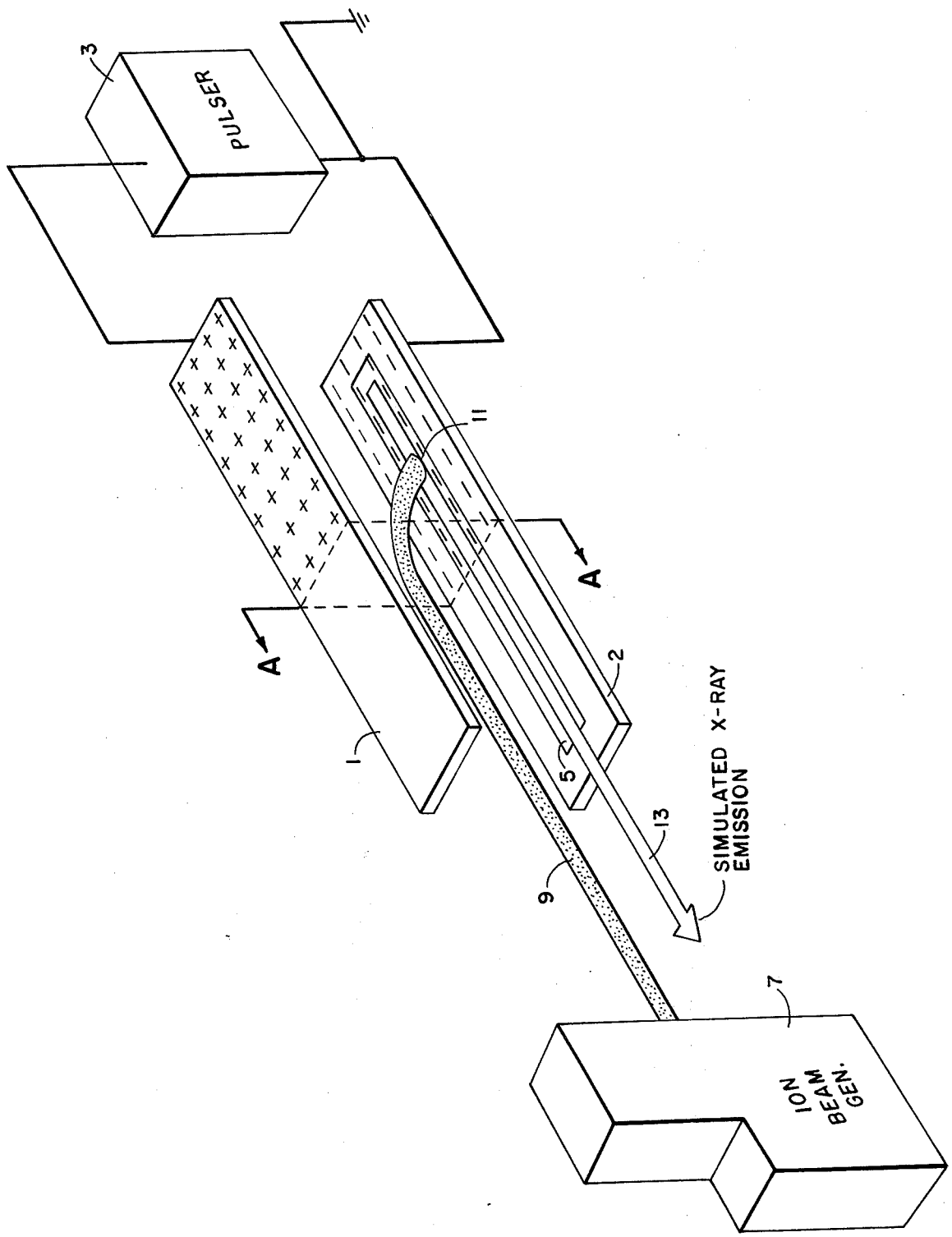

X-RAY GENERATOR

BACKGROUND OF THE INVENTION

This invention is related to the field of stimulated x-ray emission. More particular this invention is related to the field of x-ray emission caused by lasing action. The need for a coherent x-ray generator has long been present; however, the short life of the excited state of atoms which emit x-ray photons upon decay has presented a great problem to be overcome. The present invention uses a scheme which overcomes this problem and produces a coherent x-ray emission.

SUMMARY OF THE INVENTION

The operating fundamentals of the device uses "laser action" at soft X-ray wavelengths. An ion beam of completely stripped nuclei such as $He^{++}$, $Li^{+++}$, etc. is passed through a foil so as to effect resonant charge pickup in an excited state. The stripped nuclei are swept across the target in a wavefront traveling at approximately the speed of light. When the beam strikes the target, a population inversion in the states between which the laser action occurs is established by means of beam foil excitation. The foil is located in one of the two plates which are aligned parallel to the incident direction of the beam. A pulse source is connected to the ends of the two plates so as to cause a voltage pulse to travel down the plates at the speed of light. This charge will cause deflection of the beam onto the negative plate where the thin foil is located, and the beam will be deflected along and into the foil at the same speed as the wavefront propagation. In this way a volume element with a large density of excited states on the exit side of the foil is produced due to the resonant charge exchange between the beam and the hydrogen in the foil. The intersection of the beam and the target sweeps downstream in coincidence with the stimulated emission wavefront. This traveling stimulated emission constitutes laser action.

BRIEF DESCRIPTION OF THE DRAWING

The single FIGURE shows a diagrammatic illustration of the preferred embodiment.

DESCRIPTION OF THE PREFERRED EMBODIMENT

In the single FIGURE there is shown two plates 1 and 2 of a strip transmission line. Connected to the ends of these plates is a high pulse voltage source 3. Any of the conventional pulse voltage sources with a high voltage output may be used for pulser 3. A thin foil 5 (in the order of 1 mil thick) is located along one of the plates; specifically the negative plate 2.

Ion beam generator 7 produces a beam of completely stripped nuclei such as $He^{++}$, $Li^{+++}$, etc. Any of the conventional beam generators may be used for beam generator 7. For example for the production of the $He^{++}$ beam a duoplasmatron can be used to produce a beam of $He^+$. This beam is then accelerated to several hundred kev and then put through a stripping foil, where a fraction of the $He^+$ ions will be converted into $He^{++}$. The beam will then be decelerated to an energy of around 300 volts before injection between plates 1 and 2.

In operation ion beam generator 7 produces a beam of stripped nuclei 9 which travels between the plates 1 and 2 and is parallel thereto. After beam 9 has been generated and has at least traveled parallel the full length of plates 1 and 2, pulser 3 is activated to produce a high voltage pulse. This causes a wavefront A to propagate down the length of plates 1 and 2 at approximately the speed of light. The wavefront and the charge associated therewith on the plates will cause the beam 9 to deflect down to foil 5 in plate 2. Due to the travel of the pulse wavefront A, the deflection of the ion beam upon the foil target would be such that the point of intersection on the foil 11 will travel along the foil in a linear path at substantially the velocity of light. When the beam strikes the foil target and passes through to the backside, a population inversion will result due to the resonant charge exchange of the ions and the atoms in the foil, which in this case would be hydrogen.

The ions from beam 9 will pick up mainly one electron from the hydrogen due to the energy match of $He^{++}$ or $Li^{+++}$. For example, in the case of He ions on a hydrogen-rich target, the electron pick-up goes mostly (at 25 kev beam energy) as

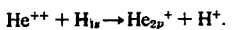

$$He^{++} + H_{1s} \rightarrow He_{2p}^+ + H^+.$$

As the $He^+$ ions emerge on the back side of the foil target, a population inversion will result between the 2p and 1s states of the ion beam and stimulated emission of this 304A transition is obtained. Since the spontaneous decay time Ys for the $He_{2p}^+ \rightarrow He_{1s}^+$ is 0.10 nanosec, the beam excitation must be swept along the foil at approximately the speed of light. In this way the stimulated emission of these excited atoms will travel along the foil and produce a stimulated x-ray emission 13. In other words the wavefront A stimulates emission of the x-ray in the traveling direction; therefore, achieving amplification of the x-ray emission and hence "x-ray laser action."

We claim:

1. A system comprising first means producing a beam of stripped nuclei; a thin hydrogen rich foil strip target means having a length; and second means connected to the target means and positioned to the beam of stripped nuclei consisting of $He^{++}$ or $Li^{+++}$ so as to cause said beam to intersect the target such that intersection of the beam and the target travels the length of said target at substantially the speed of light.

2. A system as set forth in claim 1 wherein said second means comprises first and second transmission line plates aligned parallel to said beam and said target means; third means connected to the ends of said transmission line; and said third means producing a voltage pulse to said plates for deflecting said beam.

* * * * *